United States Patent [19]

Fuchs et al.

[11] 4,435,974
[45] Mar. 13, 1984

[54] METHOD AND APPARATUS FOR LOCATING LEAKAGES IN PIPES AND SIMILAR CONDUITS

[75] Inventors: Helmut V. Fuchs, Weil; Gerold Schupp; Carl-Alexander Voigtsberger, both of Stuttgart, all of Fed. Rep. of Germany

[73] Assignee: Fraunhofer-Gesellschaft zur Foerderung der Angewandten Forschung E. V., Munich, Fed. Rep. of Germany

[21] Appl. No.: 323,298

[22] Filed: Nov. 20, 1981

[30] Foreign Application Priority Data

Dec. 4, 1980 [DE] Fed. Rep. of Germany ....... 3045660

[51] Int. Cl.³ .............................................. G01M 3/24
[52] U.S. Cl. .................................................. 73/40.5 A
[58] Field of Search ...................................... 73/40.5 A

[56] References Cited

U.S. PATENT DOCUMENTS

| 3,261,200 | 7/1966 | Long | 73/40.5 A |
| 3,626,750 | 12/1971 | Talmon | 73/40.5 A |
| 3,838,593 | 10/1974 | Thompson | 73/40.5 A |
| 3,930,556 | 1/1976 | Kusuda et al. | 73/40.5 A |

Primary Examiner—Gerald Goldberg
Assistant Examiner—Joseph W. Roskos
Attorney, Agent, or Firm—Murray Schaffer

[57] ABSTRACT

Leaks in fluid conveying pipe-lines, in which the noise from the escaping fluid at the position of the leak creates sound waves are detected by at least one sound sensor and, at a known distance from it, a sound reflector, both of which are in direct contact with the fluid. The sound sensor receives the directly incident sound waves, and also the reflected sound waves from the sound reflector. The received signals are evaluated using an autocorrelation function.

12 Claims, 11 Drawing Figures

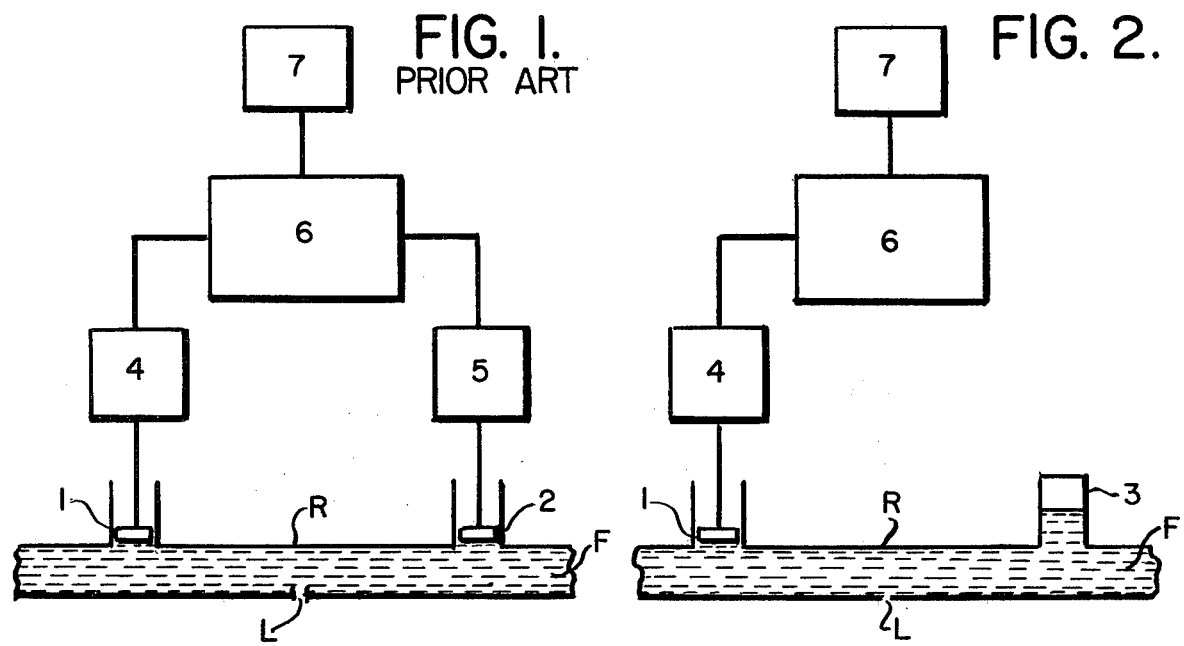
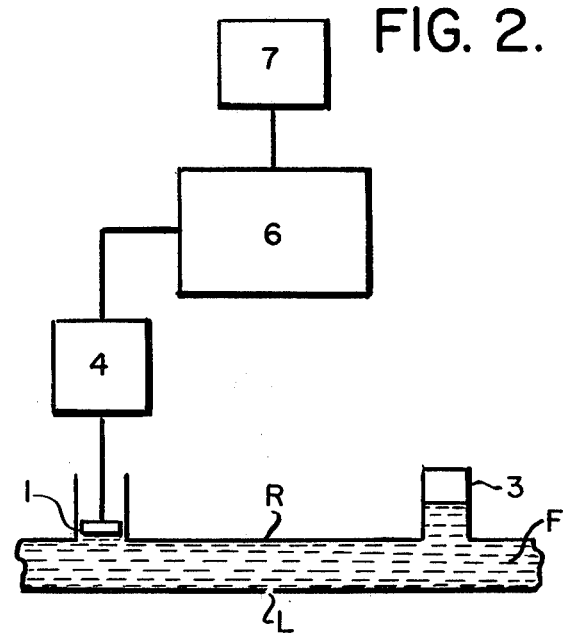
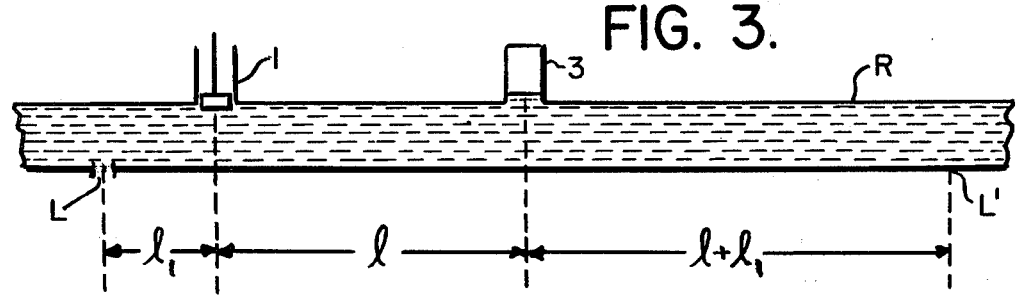
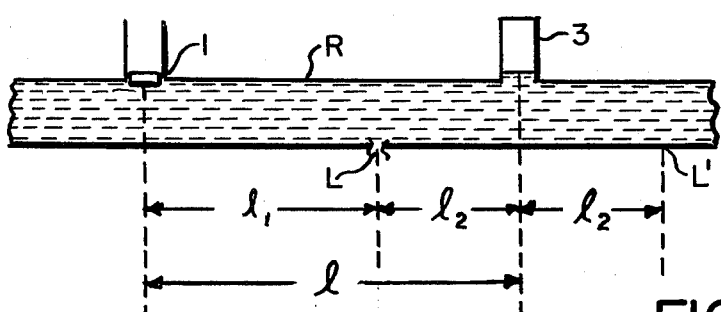
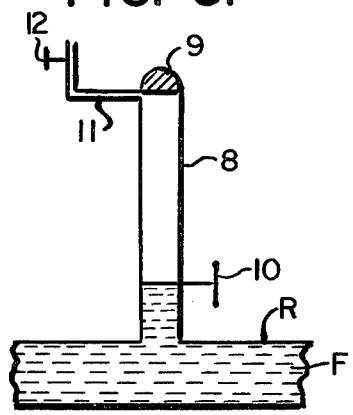
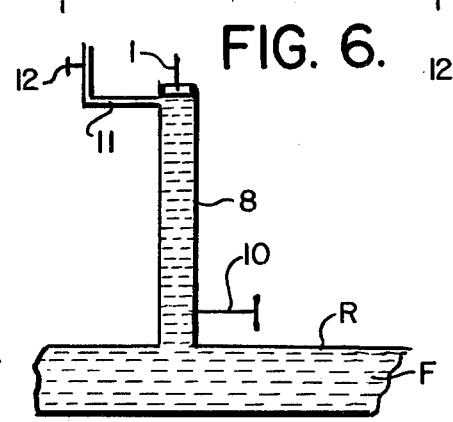
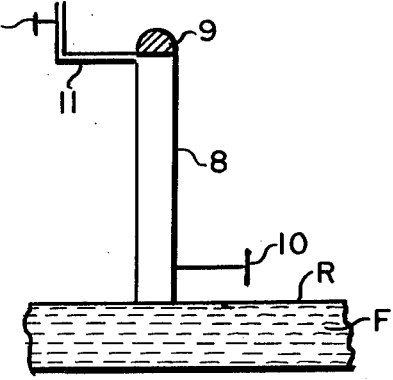

FIG. 8.
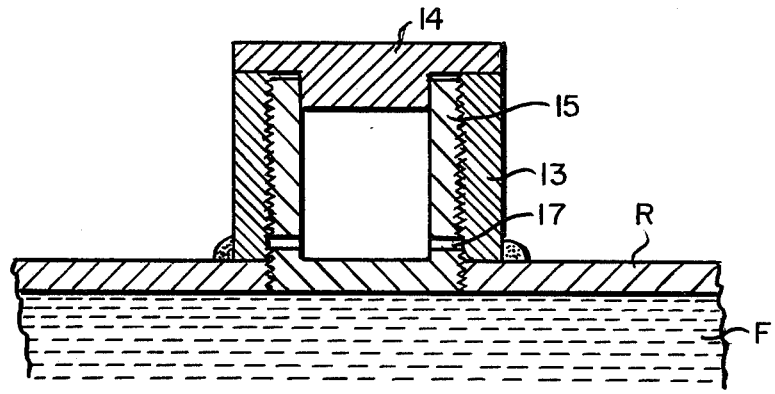
FIG. 9.
FIG. 10.
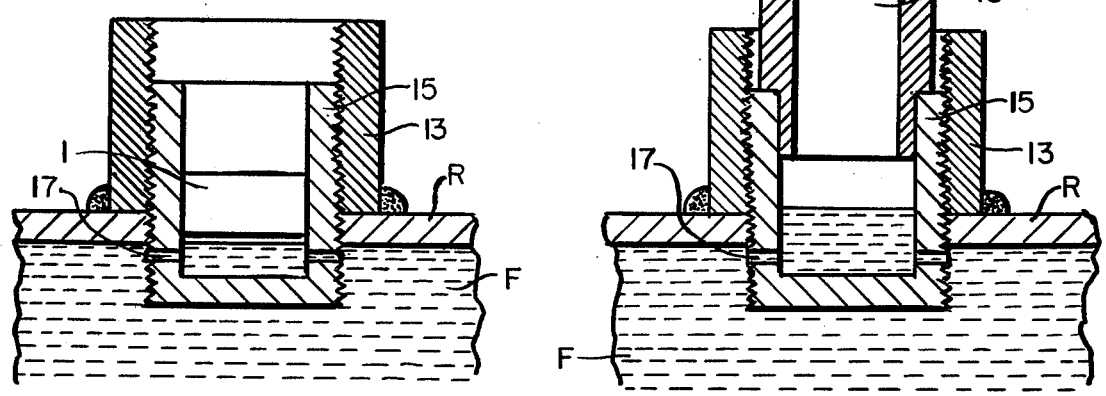
FIG. 11.
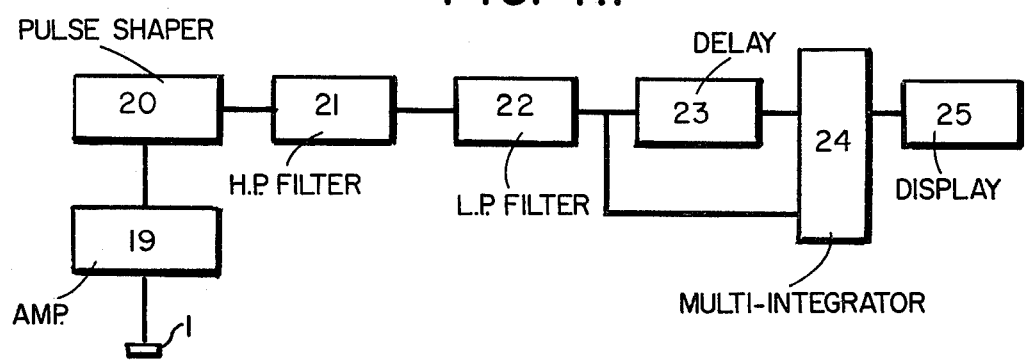

METHOD AND APPARATUS FOR LOCATING LEAKAGES IN PIPES AND SIMILAR CONDUITS

BACKGROUND OF THE INVENTION

The invention specifies a method of locating the position of leaks in fluid medium (fluid) conveying pipe-lines, in particular in water supply networks.

PRIOR ART

There are numerous methods and apparatuses known to localize leak positions in pipe-lines which make use of the fact that at the position of the leak the fluid escaping creates noise, the sound waves of which propagate with falling intensity. In the oldest and simplest of these methods one attempted to trace the sound waves back to their origin, i.e. the position of the leak, by ear with the aid of short hearing rods placed on exposed pipe components such as hydrants or manhole covers, or through sound domes layed on the ground above the pipe. These detection methods, however, are strongly influence by interference noise, e.g. traffic noise, and falsified by variations in of the ground or the pipe, so that they only rarely enable a sufficiently certain and accurate localization of the position of the leak. The substitution of the human ear with a microphone or another sound sensor cannot improve these deficiencies even when the sensor technology used is selectively adapted to the characteristic sound spectrum of the noise source. (compare U.S. Pat. No. 3,261,200; U.S. Pat. No. 3,626,750).

According to DE-OS No. 23 52 532 (FIG. 6), there is known an apparatus consisting of two separately situated sound sensors known for the acoustical localization of leak positions in pipe-lines, whose measurement signals are evaluated to determine the location of the sound source in relation to the sound sensors by a cross-correlation method (without time delaying the signals). In this case because the sound sensors are built into a device which can move along within the pipe the distance required between the sensors for accurate measurements can hardly be accomplished due to the limited space. Besides the problem remains that the respective position of the device in the pipe must also be found through additional measurements for the localization of the position of a determined leak.

The leak localization method shown in U.S. Pat. No. 3,930,556 comes next in the development of the prior art. A number of sound sensors are positioned along a liquid filled pipe at known intervals, which respond to sound waves emitted from an eventual leak and from the output signals of which the transmission time differences of the signals, and hence the distance between the position of the leak and the next measuring station, are determined by the use, among other, of a cross-correlation method. In one design of this method the position of the leak is surrounded by a segmented sound insulating jacket radially spaced about the pipe, in which the sound sensors are inserted. This apparatus is very laboriously constructed if only because of the jacket for the pipe. The measuring arrangement also described in FIGS. 1 and 7 of the aforementioned patent specification does not employ a jacket pipe, but uses sound sensors directly coupled to the pipe wall. These, however, are then not protected against interference sounds. Both arrangements furthermore require numerous cable connections to each sound sensor and to the measuring instrument.

OBJECT OF THE INVENTION

The object of the invention is to provide a method and apparauts for localizing leak positions in pipe-lines, that does not require substantial constructional changes of the pipe-line, few cable connections and no large technical measuring system. The method according to the present invention should be simple to carry out. Further to this the effect of noise borne by the pipe-line, or of background interference noises on the results should be strongly suppressed.

SUMMARY OF THE INVENTION

According to the present invention a method for the localization of the position of leaks in a fluid medium (fluid) conveying pipe-lines, in particular in water supply networks, in which the noise from escaping fluid at the position of a leak creates sound waves which may be detected by sound sensors in the vicinity along the pipe-line and the propagation time differences of the sound waves and hence the distance between the position of the leak and the measuring station are determined by mounting at least one sound sensor and a sound reflector on the pipe at a known distance from one another, both of which are directly in contact with the fluid. The sound sensor detecting not only the sound waves directly emanating from the position of the leak, but also those reflected by the sound reflector. The recorded signal is evaluated by an autocorrelation analysis.

The fundamental idea of the invention is such, as compared to the known pairing of two sound sensors one of the sound sensors is replaced by a sound reflector which sends incident sound waves back in the direction of the remaining sensor. In this system the sound sensor senses the direct sound waves, as well as those via the sound reflector both of which are transformed into electrical signals, from which the propagation time differences of both sound waves, and hence the distance of the position of the leak from the sound sensor or the sound reflector can be determined with the aid of an autocorrelation method.

Thereby the sound reflector creates an acoustic mirror image of the position of a possible leak in the test section which is outside the test section. At every position in the pipe-line the sound waves emitted from the second pseudo sound source exhibit a well defined phase or propagation path difference relative to the sound waves emitted from the real positon of the leak. Thereby it is possible to gain the same information (as a propagation time difference) in a slightly modified form from only one measurement station which from the conventional two point correlation methods is otherwise obtained from two separate measurement stations. The sound reflector also reduces the infiltration of interference sounds in the test section as it also reflects sound waves originating from that part of the pipe-line which is external to the measuring section back to that section of pipe. For this and for an exact localization of the positon of the leak it is presumed that the sound sensor and sound reflector are in direct contact with the fluid held in the pipe, because the propagation properties of sound waves within the pipe-line of almost constant cross-section are better defined than of those in the pipe wall or in the earth.

The accuracy of the localization method specified in the invention can be further improved, if after the first measurement the sound sensor and sound reflector are exchanged with one another and with this arrangement a further measurement is carried out.

If the speed of sound in the fluid is not known with sufficient accuracy, for example when the water contains air bubbles, the propagation speed of the sound waves must be evaluated with the aid of an autocorrelation analysis prior to the localization. For this it is advantageous if a sound transmitter in contact with the fluid is mounted to the pipe-line in the vicinity of the test section.

It is particularly advantageous for liquid filled pipes if the sound reflector is a volume of gas, in particular a volume of air, which at least during the measurements, remains in contact with the liquid. Such a gas volume can easily be realized using a ventilating apparatus on upward facing sidebranches such as stub pipes or hydrants. After bleeding and filling with the fluid the same sidebranch can also be used for a sound sensor connection. With the use of such an arrangement of sound sensors and sound reflectors the localization method specified in the invention can be carried out without first having to unearth parts of the pipe-line.

Instead of the acoustically soft volume of gas a sound reflector can be employed, in particular in gas or steam pipe-lines, which on its sound sensor facing side exhibits an acoustically hard surface as is the case with an at least partially closed valve.

In order to prevent resonances interfering with the localization, it is advantageous, if only one fluid connected sound reflector is present during every measurement in the pipe-line under test. Sidebranches containing a volume of air connected to the pipe-line and which are not the respective measurement reflector must if present be bled.

The correlation methods have an advantage over all subjective acoustic leak localization methods, which merely use changes in intensity of the noise from the position of the leak in that they function widely independent of the intensity of the sensed sound waves. The effective signal (self-induced noise of the leak) can be lower in intensity than the sum of all the interferences which arrise from other acoustic or electronic interference sources. The interference suppression is significantly improved in the specified invention in that at one end of the test section the intended sound reflector reflects nearly all the incident sound waves which emanate from outside of the test section at that end of the pipe-line. The test section is thereby shielded from the incident interference sounds from one side of the pipe-line. This shielding can be accomplished on both sides by exchanging the sound sensor with the reflector sequentially.

The single point autocorrelation applied according to the invention has still further advantages over the conventional two points cross-correlation method in that fewer measuring instruments (sound sensors, amplifiers, filters etc.) are necessary and the resulting phase errors of the asymmetry of multiple channel measurements are eliminated. The measurement process is as a whole simplified, in that it is necessary only to work at one measurement station, and only to lay cable to it. Finally the correlator itself can be more simply assembled.

BRIEF DESCRIPTION OF THE DRAWINGS

In the following the localization method and apparatus according to the invention are exemplified by the schematic drawings and block circuit diagrams apended hereto.

Shown are in

FIG. 1 is a schematic an arrangement for the localization of the position of a leak with the aid of the presumed known two point cross-correlation method, FIG. 2 is a schematic a corresponding arrangement with a sound reflector for the single point autocorrelation method according to the invention, FIGS. 3 and 4 show sketches of the test arrangement of FIG. 2 with postions of the leak in the test section, FIGS. 5 to 7 show the application a vertical sidebranch as sound sensor or sound reflector, respectively, FIGS. 8 to 10 show connection pieces for fixing a sound sensor or a sound reflector directly to a pipe-line, FIG. 11 is a block circuit diagram of the electrical amplifiers, filters and correlation arrangements.

DETAILED DESCRIPTION OF THE INVENTION

FIG. 1 shows the very simplified test arrangement for the presumed known two point cross-correlation method. Two sound sensors 1 and 2 are fixed at the ends of a test section of length 1 of a fluid F conveying pipe-line R, their signals being conducted to the conventional correlator 6 via amplifier arrangements 4 and 5, respectively. The correlation function is displayed via an x-y recorder 7 or an oscillograph (not shown).

The test arrangement for the single point autocorrelation method specified by the invention is shown correspondingly in FIG. 2. The corresponding parts are labled with the same numbers in both figures. The main difference between FIG. 1 is only that the second sound sensor 2 is replaced by a sound reflector 3 thus sparing the amplifier 5, and the correlator 6 is fed with just the signal from the remaining sound sensor 1.

The positon of the leak is denoted by L in both FIGS. 1 and 2.

From the test arrangement of FIG. 1 the cross-correlation function is evaluated $$R_{12}(\tau) = \overline{p_1(t)p_2(t+\tau)}$$

and after exchanging the sound sensors $$R_{21}(\tau) = \overline{p_2(t)p_1(t+\tau)}$$

where $p_1(t)$ and $p_2(t)$ are equal to the time functions of the pressure pulsations at the sound sensors 1 and 2 respectively, and $\tau$ is the time delay of the signals. The bar denotes that the time average value is evaluated.

In the case of the arrangement according to FIG. 2, however, the autocorrelation function is determined $$R_{11}(\tau) = \overline{p_1(t)p_1(t+\tau)}$$

and after exchanging the sound sensor with the sound reflector $$R_{33}(\tau) = \overline{p_3(t)p_3(t+\tau)}$$

In both versions of the correlation method; possible peaks $R_{12}$, $R_{21}$, or $R_{11}$, $R_{33}$ are investigated for possible peaks of $\tau = \tau_{max}$. The form of the peak at $\tau_{max}$ is dependent on the spectral distribution of the leak noise responsible for the peak. When displaying the correlation function against time delay maximum values of the correlation $R_o$ are seen to appear at $\tau=0$ in any case, even when no leak noise is present:

$$R_{11}(\tau=0)=R_{33}(\tau=0)=R_o$$

A second peak $R_{max}$ occurs always if a noise source, for example a leak, is located near the sound sensor. Then two cases concerning the position of the leak shown in FIGS. 3 and 4 can generally be differentiated. In these figures the same nomenclature as in FIGS. 1 and 2 are used. In addition, the acoustically reflected pseudo image of the real leak L is denoted by L'. The lengths $l_1$, and $l_2$ represent the distances between the measurement station (sound sensor) and the sound reflector 3, and the distances between the position of the real leak L, and the measurement station and reflector respectively.

In the first of the cases shown in FIG. 3 the position of the leak is outside the test section 1. The second peak in the correlation function corresponding to the propagation path difference $\Delta l = 2l$ between the direct and reflected component of the sound, occur at $$R_{11}(\tau_{max}) = R_{max} \text{ with } \tau_{max} = \frac{2l}{C_F}$$

where $C_F$ is the propagation speed of the sound waves in the fluid (e.g. in water $C_F \approx 1400$ m/s). Thus the result of the test is independent of the distance $l_1$ between the position of the leak L and the measuring station 1. From the value of $\tau_{max}$ the respective sound propagation speed $C_F$ only is evaluated from the known test section length l. The reliability of this measurement, which distinguishes itself by the high interference suppression, can be checked by subsequently interchanging the sound sensor 1 with the sound reflector 3. The correlation function $R_{33}(\tau)$ should then not indicate a second peak, because the sound waves from the position of the leak are blocked by the sound reflector 3. In this case one knows after the first measurement in which direction in the pipe-line must be further searched for the position L of the leak by continuing measurements in another test section.

In the other case illustrated in FIG. 4 the position of the leak is within the test section l. The second peak in the correlation function which corresponds to the propagation path difference $l=2l_2$ between the direct and reflected components of the sound, now occurs at $$R_{11}(\tau_{max}) = R_{max} \text{ with } \tau_{max} = \frac{2l_2}{C_F}$$

This result of the localization of a leak can be further checked by interchanging the sound sensor 1 and the sound reflector 3 following the first measurement. The second peak in the correlation function must then be at $$R_{33}(\tau_{max}) = R_{max} \text{ with } \tau_{max} = \frac{2l_1}{C_F}$$

where $l_1 = l - l_2$ is necessary.

The evaluation of the autocorrelation measurements especially the evaluation of the second peak which is the decisive one for determining the position of a leak are considerably eased if the output signal of the sound sensor 1 before being applied to the correlator 6 is passed through a filter arrangement in which its spectrum is conditioned such that the second peak $R_{max}$ is more clearly identifiable.

FIG. 11 illustrates such a filter arrangement in the block circuit-diagram as part of the autocorrelation circuit. Specified in this figure is that the output signal of the sound sensor be fed into a spectrum shaper 20 via a suitable amplifier 19. The test signal can thus be modified to give all frequency components an approximately equal strength over the whole measuring range. In the subsequent band pass filters 21 and 22 the frequency band of the test signal may be limited below (high pass filter) and above (low pass filter). The signal thus optimal conditioned for the actual correlation is then fed once directly as $p_1(t)$ and once via a delay channel 23 as $p_1(t+\tau)$, to the multiplier/integrator 24 (for averaging) in which $R_{11}(\tau)$ is established. An oscilloscope or an x/y recorder with a correspondingly prepared graphical screen or paper serves as the output section 25 for the result (as a function of $\tau$).

It is essential that the second sensor (1) as well as the sound reflector (3) are directly in contact with the fluid. Thereby the attachment of the measurement station and the reflector do not require any unearthing of already existing pipe-lines in particular in water supply networks. Therefore parts of the network which naturally protrude above the earth surface e.g. hydrants, stub pipes can be used to attach there components.

Such arrangements are illustrated in FIGS. 5 to 7. FIG. 5 shows the arrangement of a short vertical stub pipe 8 on a water supply pipe R. The stub pipe 8 has a stop valve 10 near its connection to the main pipe, as well as a ventilating and bleed tube 11 with a compressed air valve 12 near the top of the stub pipe. On the top end of the stub pipe 8 an end cap 9 seals the pipe.

FIG. 6 illustrates the use of the same stub pipe as FIG. 5 as a measurement station for attaching a sound sensor 1. For this purpose the end cap is removed and replaced with a pressure transducer (hydrophone) on top of the stand pipe 8 as the sound sensor. The stop valve is then opened and the stub pipe fully bled via the tube 11 so that the fluid F forced by the pressure of the supply network rises and finally reaches the pressure sensitive area of the pressure transducer 1.

When the stub pipe is manipulated to become the sound reflector it retains its end cap 9 as specified in FIG. 7 and after opening the stop valve 10 is filled with compressed air via the tube 11 and valve 12 until the fluid is fully displaced out of the stub pipe 8. In the stub pipe there is then only an air cushion left which acts as a reflector to the sound waves in the main pipe-line.

During the measurements the stop valve in the arrangements of FIGS. 6 and 7 must stay continually open. On using the stub pipe as a reflector (FIG. 7) it is important to take care that a large enough air cushion is maintained. Hydrants can be used as measuring stations or reflectors in a similar way as described above for a stub pipe.

When there are no stub pipes or hydrants in a pipe-line system which can be used as measurement stations or reflectors, or when an above ground pipe-line is easily accessible, the components of the apparatus can also be directly attached to the pipe-line. This can be achieved for example with the aid af a connection piece as shown in FIGS. 8 to 10.

FIG. 8 shows a cross-sectional view of the attachment piece. It consists of a circular lug 13 which is welded to the pipe wall R, in which a cavity formed insert 15 provided with radial side boring 17 is screwed flush with the inner wall of the pipe-line. The attachment piece is sealed with a cap 14 when it is not used as an adapter.

FIG. 9 illustrates the attachment piece when it is used as a measuring station with a sound sensor 1 attached to the cavity insert 15. The protection cap 14 is for this purpose removed and the insert 15 screwed into the circular lug until its side borings 17 enter the pipe and the fluid F reaches the pressure sensitive area of the sound sensor 1 via the borings 17. The sound sensor can be a small piezo-electric or piezo-resistive pressure transducer.

When using the attachment piece as a sound reflector, the protection cap 14, according to FIG. 10, is also removed from the circular lug 13 and the cavity forming insert 15 is screwed in the circular lug 13 until the side borings 17 protrude the pipe wall R. A dome formed container 16 is fixed at the top end of the insert 15 which in conjunction with the interior of the insert 15 traps an air cushion 18. The air cushion 18 is in contact with the fluid F through the borings 17. The air cushion 18 must be big enough to fulfil its duty as a sound reflector in the fluid F.

We claim:

1. A method for finding the position of leaks in a fluid conveying pipe-line such as in a water supply networks, comprising the steps of:
   (a) attaching a sound sensor at a first position in said pipe-line such that said sound sensor is in direct contact with said fluid;
   (b) attaching a sound reflector at a second position in said pipe-line such that said sound reflector is in direct contact with said fluid and such that said sound sensor and said sound reflector are coupled acoustically through said fluid, said second position being spaced from said first position a predetermined distance;
   (c) supplying the signal produced by said sound sensor into a signal analyzer;
   (d) making an autocorrelation analysis of said signal in said signal analyzer;
   (e) determining a characteristic propagation time difference from a characteristic maximum of such autocorrelation function which has been determined by said autocorrelation analysis and which propagation time difference corresponds to the difference of the propagation time of the sound wave which has passed directly between said leak and said sound sensor and the propagation time of the sound wave which is has passed from said leak via said sound reflector to said sound sensor;
   (f) determining the distance between the positions of said leak and said sound reflector from said obtained propagation time difference.

2. The method according to claim 1 including the steps of connecting an electric filter between said sound sensor and said signal analyzer and adjusting, said filter such that said propagation time difference is particularly clearly distinct.

3. The method according to claim 1 including the steps of interchanging said sound sensor with said sound reflector after steps (c) to (f) have been carried out, and after said interchangement said steps (c) to (f) are carried out again.

4. The method according to claim 3 wherein the propagation speed is obtained by attaching an additional sound transmitter to said pipe-line.

5. The method according to claim 1 including the steps of evaluating the propagation speed of said sound waves in said fluid using an autocorrelation analysis before the positions of the leak is located.

6. A system for finding the position of leaks in a fluid conveying pipe-line, such as in a water supply network, comprising:
   (a) a sound reflector attached at a first position in said pipe-line in direct contact with said fluid;
   (b) a sound reflector attached at a second position pipe-line in direct contact with said fluid such that said sound sensor and said sound reflector are coupled acoustically through said fluid, said second position being spaced from said first position a predetermined distance;
   (c) an electronic signal analyzer connected to said sound sensor, said signal analyzer being adapted to make an autocorrelation analysis of a signal received solely from said sound sensor;
   (d) means for determining a characteristic propagation time difference from a characteristic maximum of such autocorrelation function which has been determined by said autocorrelation analysis and which propagation time difference corresponds to the difference of the propagation time of the sound wave passing directly between the leak and said sound sensor and the propagation time of the sound wave passing from the leak via sound reflector to said sound sensor;
   (e) means for determining the distance between the positions of said leak and said sound reflector from said obtained propagation time differences.

7. The system according to claim 6 wherein said sound reflector is so arranged as to also reflect or absorb interference noises emanating from that section of the pipe-line which opposes said sound sensor.

8. The system according to claim 7 wherein said fluid is a liquid and said sound reflector is a volume of gas, which is in contact with said liquid within said pipe-line at least during the period wherein said sound sensor senses.

9. The system according to claim 7 wherein said fluid is a gas and said sound reflector at least on the side facing towards said sound sensor, is provided with an acoustically hard surface.

10. The system according to claim 8 wherein at least one of said sound sensor and said sound reflector are attached to said pipe-line in existing couplings attached to short sidebranchs or hydrants.

11. The system according to claim 10 including bleed means provided in said sidebranch or hydrant which allows said sidebranch or hydrant to be used alternatively as a connection for said sound sensor or said sound reflector.

12. The system according to claim 8 wherein said sound sensor and said sound reflector are attached directly to said pipe-line via lugs fixed to the wall of said pipe-line.

* * * * *